March 31, 1925.
C. E. COCHRAN
1,531,735
INDUSTRIAL TRUCK
Filed July 9, 1920
8 Sheets-Sheet 3
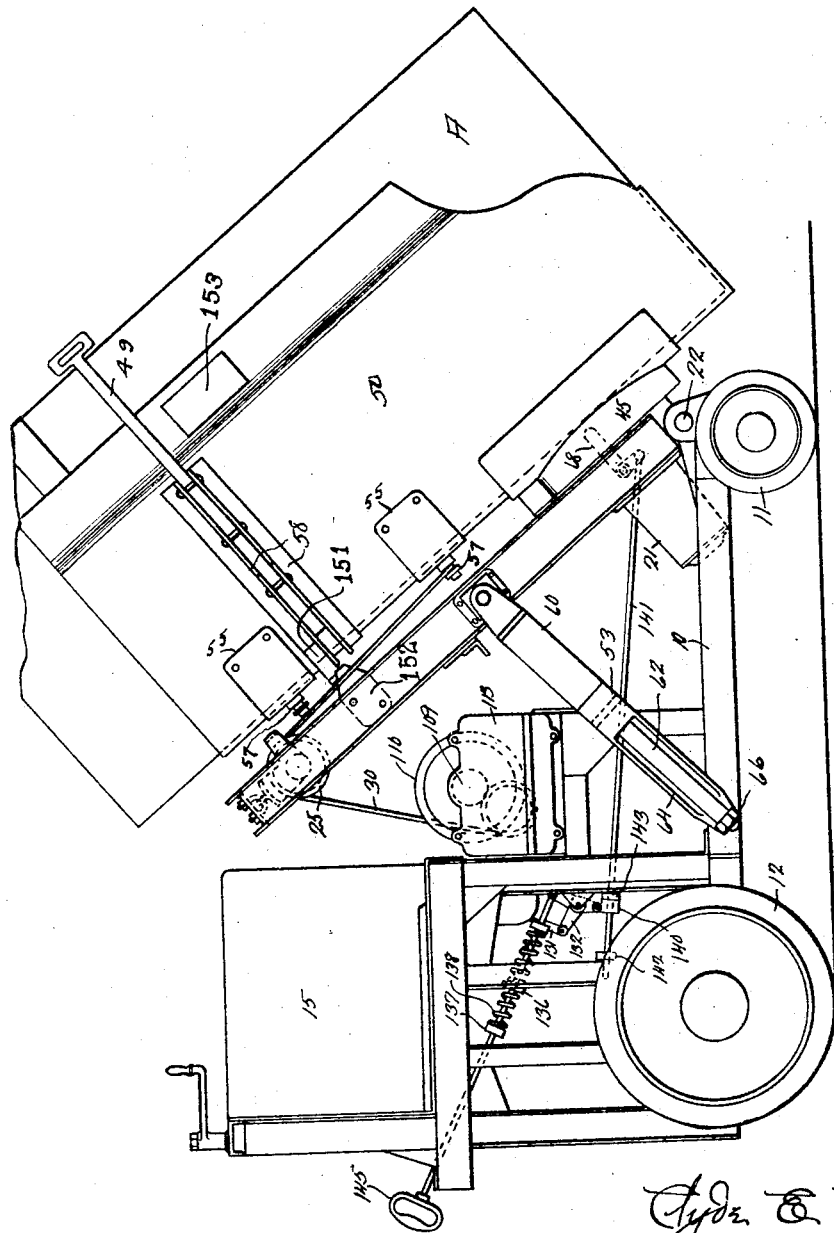

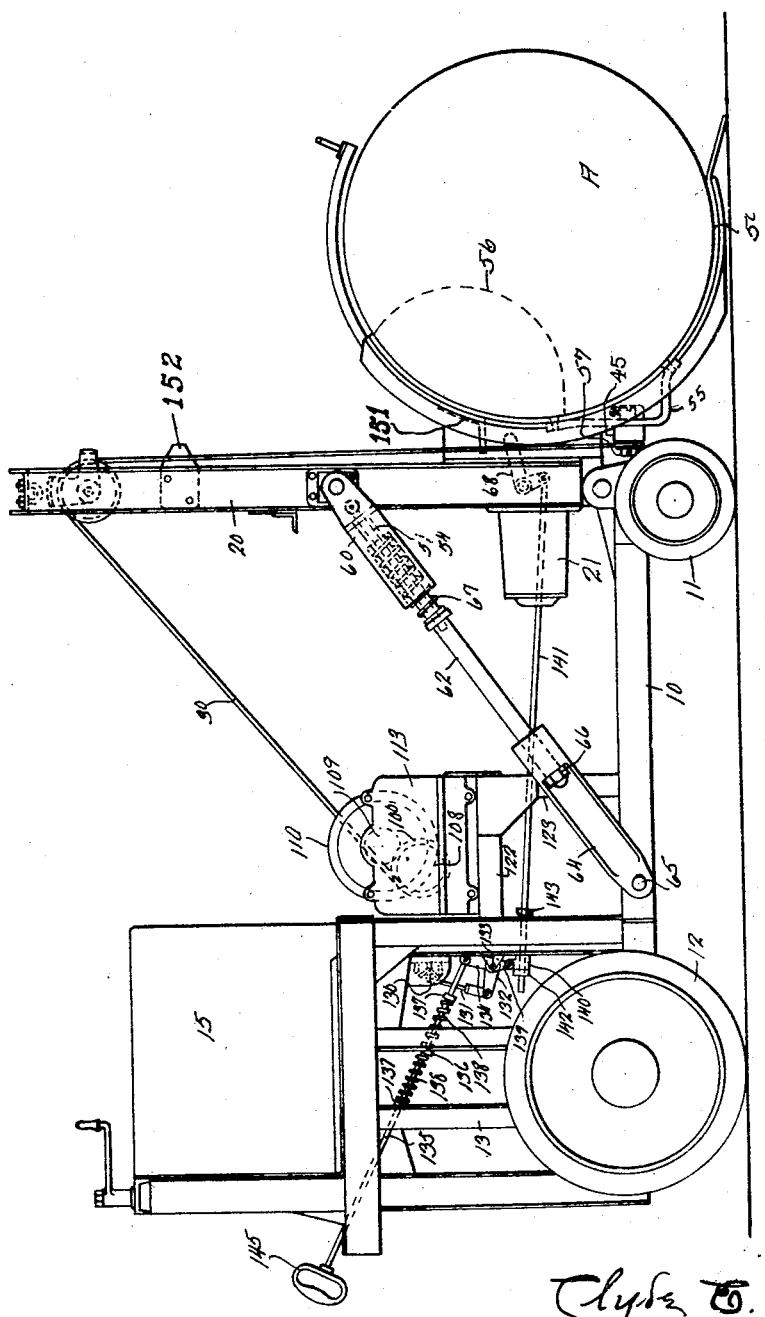

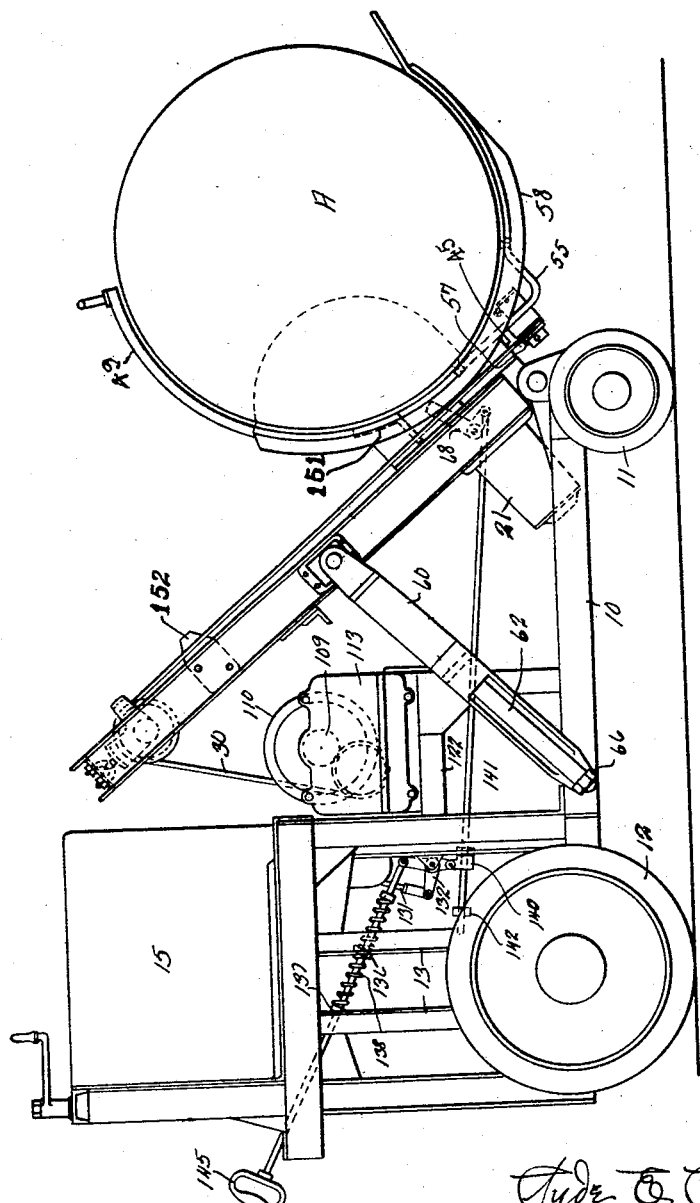

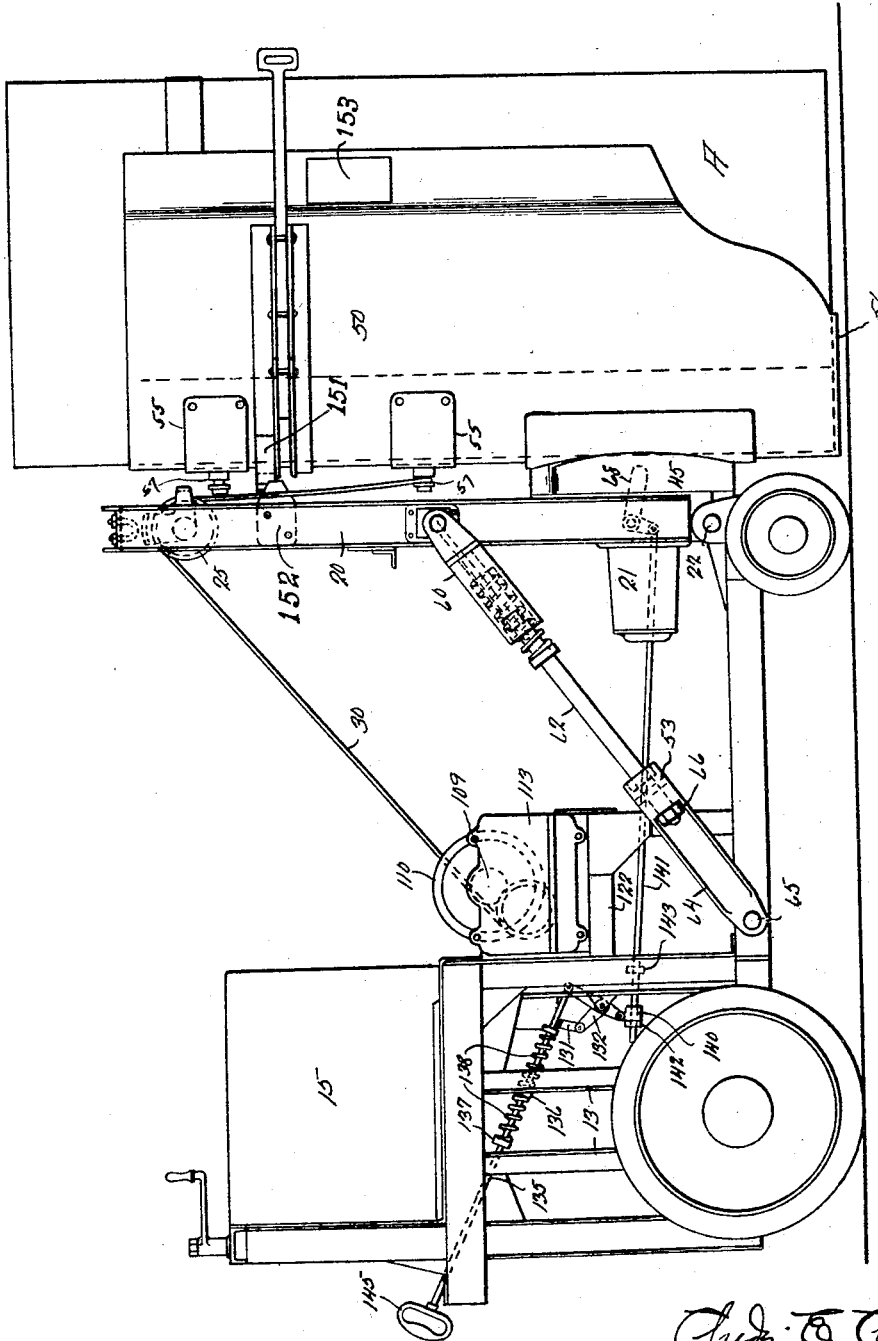

March 31, 1925.
C. E. COCHRAN
INDUSTRIAL TRUCK
Filed July 9, 1920
1,531,735
8 Sheets-Sheet 5
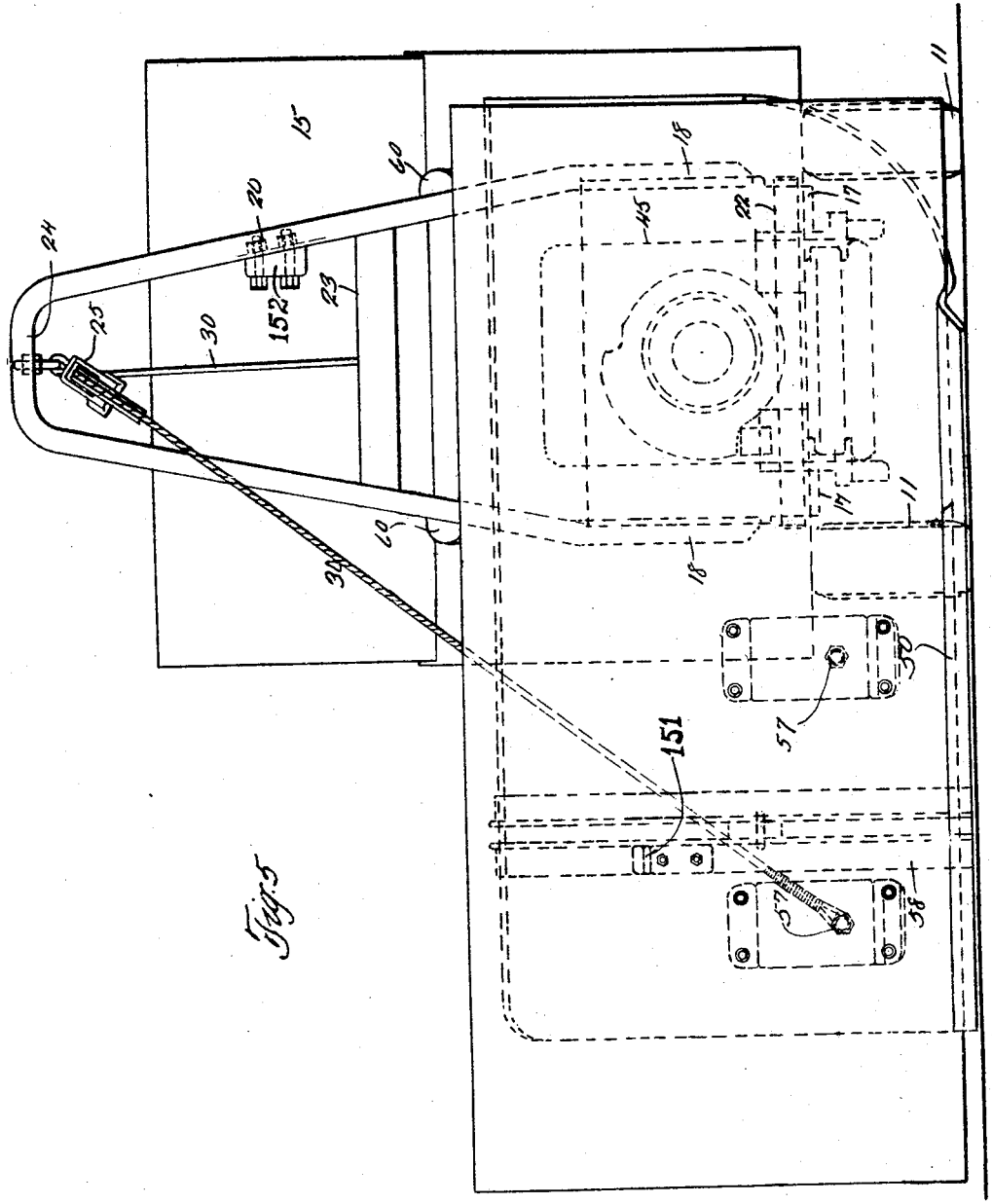
Inventor March 31, 1925.  1,531,735
C. E. COCHRAN
INDUSTRIAL TRUCK
Filed July 9, 1920    8 Sheets-Sheet 6
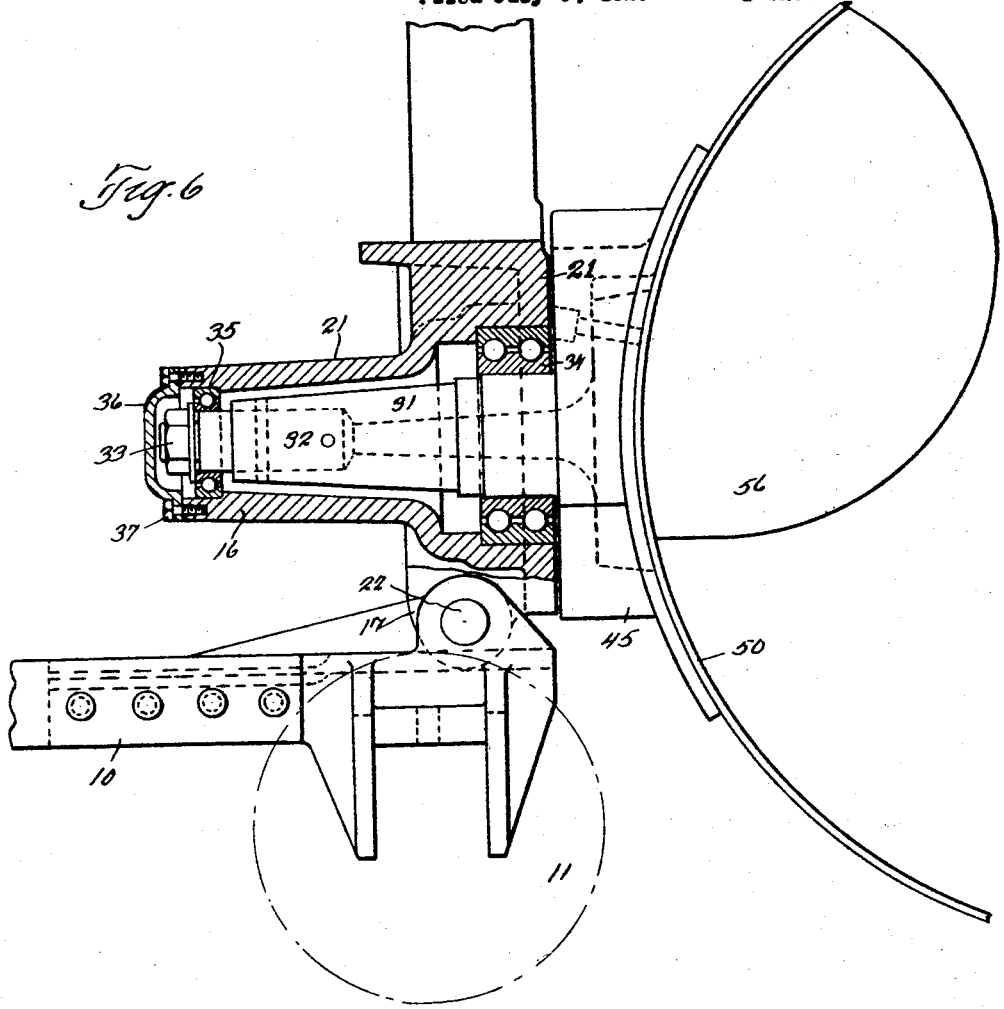
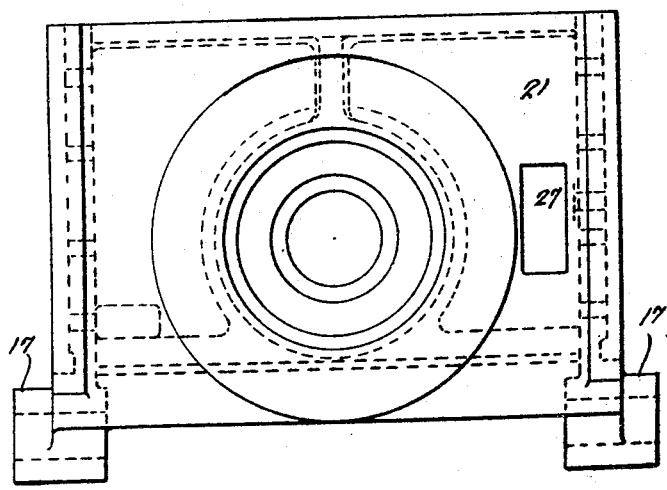
Inventor
Clyde E. Cochran
By Bates & Macklin,
Attys.

March 31, 1925.  
C. E. COCHRAN  
INDUSTRIAL TRUCK  
Filed July 9, 1920  
1,531,735  
8 Sheets-Sheet 7

Inventor  
Clyde E. Cochran,  
By Bates Macklin,  
Attys.

March 31, 1925. 1,531,735
C. E. COCHRAN
INDUSTRIAL TRUCK
Filed July 9, 1920 8 Sheets-Sheet 8

Inventor
Clyde E. Cochran,
By
Bates & Macklin, Attys.

Patented Mar. 31, 1925.

1,531,735

UNITED STATES PATENT OFFICE.

CLYDE E. COCHRAN, OF CLEVELAND, OHIO, ASSIGNOR TO THE ELWELL-PARKER ELECTRIC COMPANY, OF CLEVELAND, OHIO, A CORPORATION OF OHIO.

INDUSTRIAL TRUCK.

Application filed July 9, 1920. Serial No. 394,933.

*To all whom it may concern:*

Be it known that I, CLYDE E. COCHRAN, a citizen of the United States, residing at Cleveland, in the county of Cuyahoga and State of Ohio, have invented a certain new and useful Improvement in Industrial Trucks, of which the following is a full, clear, and exact description, reference being had to the accompanying drawings.

This invention relates to an automobile truck provided with mechanism for receiving a load and moving it through two stages of operation into transportable position, and after transportation, depositing it.

The general object of the invention is to provide simple and efficient power mechanism for raising and positioning the load and effectively carrying it during transportation and readily depositing it under the accurate control of the operator.

More particularly my invention provides a truck equipped with a flexible member extending over a suitable boom hinged at its lower end to the truck frame, the load being received in a suitable support pivoted to the lower end of the boom. The flexible member first raises the load by tipping the boom over the truck body and then up-ends the load by rotation of the pivotal support into a convenient transportable position. A suitable spring mechanism supports the tipped boom and automatically returns it to load-discharging position, when the relaxing of the flexible member permits such movement.

My invention may be embodied in a truck adapted for receiving, elevating and up-ending paper rolls, and transporting them and thereafter depositing them.

The above features and others contributing to the efficiency of the machine are hereinafter more fully explained in connection with an approved embodiment as shown in the accompanying drawings. The essential characteristics of my invention are summarized in the claims.

In the drawings Fig. 1 is a side elevation of the truck with the parts in position just after receiving the load, in this case a paper roll lying horizontally.

Fig. 2 is a similar view showing the parts in position with the boom tipped and the load still horizontal in extreme elevated position.

Fig. 3 is a similar view showing the parts in position for transporting the load, the load having been rotated into up-ended position.

Fig. 4 is a similar view showing the parts in position with the boom in original position and the load in vertical position about to be discharged.

Fig. 5 is a rear elevation of the truck and load in the position described in Fig. 1.

Fig. 6 is an enlarged view in side elevation, parts being shown in section, showing in detail the hinged connection of the boom with the rear end of the truck, and the pivotal arrangement of the load-receiving member at the lower end of the boom.

Fig. 7 is a front elevation of the casting constituting the lower end of the boom for receiving the pivotal paper roll support.

Figure 9:
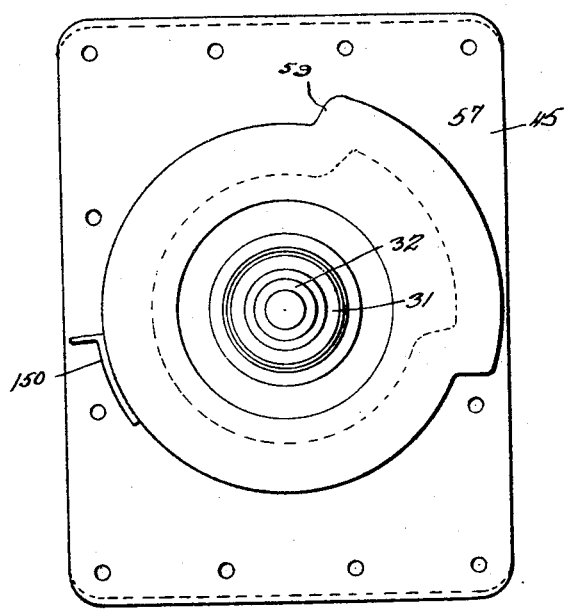
Fig. 9 is a front elevation of the pivotal paper roll support.
Figure 8:
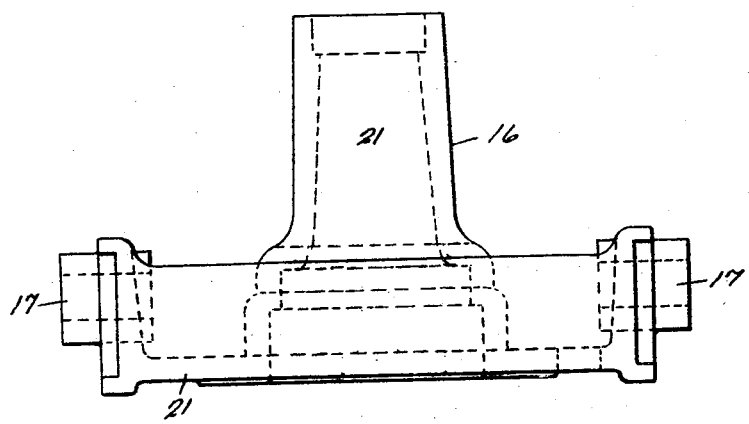
Fig. 8 is a plan of the same.

As shown in Figs. 1 to 4, 10 indicates the frame body of the truck which is supported by rear wheels 11 and forward wheels 12. These forward wheels are on opposite sides of a front housing 13 composed of upright and transverse members secured to the frame member 10. This housing may carry a suitable motor (not shown) for rotating the front wheels, and these wheels may be steered by any mechanism, not shown. On the upper part of the front housing is a space 15 suitable for a storage battery for driving the truck, and this same battery may be availed of for operating the cable-winding mechanism hereinafter described.

The construction of the frame, wheels, housing, etc., above mentioned, does not enter into the present invention. They may if desired be formed according to Patent No. 1,260,145, granted March 19, 1918, to the Elwell-Parker Electric Company as assignee of Clyde E. Cochran.

In the present invention, I hinge to the rear end of the truck frame 10 a boom 20. This is composed of an approximately upright member, shown as an outwardly facing channel beam bent into inverted U- shaped form and suitably braced as at 23. Between the arms of the channel beam and rigidly secured to them at their lower ends is a casting 21 which is pivoted at 22 on a horizontal pivot to the truck frame.

The casting 21 is provided with bearings adapted to receive in pivotal relation the stub shaft or axle of a second casting 45 to which is suitably secured a scoop 50, the casting 45 and scoop 50 together constituting a support on which the load, in this case a paper roll, may be rolled and thereafter tilted into substantially upright position.

The casing 21 is preferably substantially rectangular, having an elongated hub 16 extending forwardly around a central opening. The lower corners are provided with ears 17 adapted to be received on a shaft 22 secured to the rear end of the truck body 10. The sides may be suitably flanged to receive the ends of the bent channel beam constituting the boom 20, which may be secured thereto in any desired manner.

The load supporting member preferably consists of the casting 45 illustrated in Figs. 6 and 9, to which is suitably secured as by bolts or rivets passing through holes 27, the arcuate scoop 50 having a partially closed end 56 and projecting lugs 57 mounted on suitable plates 55 which are secured to the scoop 50. Located between the plates 55 are reinforcing ribs 58 between which an arcuate retaining latch 49 is slidably mounted. Projecting forwardly from the center of the casting 45 is a tapered hollow stub shaft or axle 31, having inserted at the forward end a hardened steel pivot 32 having a reduced threaded end adapted to receive a nut 33.

The stub shaft 31 is adapted to rotate in ball races 34 within the rear portion of the casting 21, while the forwardly extending pivot 32 has a bearing within ball races 35. A protecting cap 36 may be secured as by bolts 37 to the outer end of the hub 16.

Depending from the top portion 24 of the boom at the junction of the arms of the inverted U-shaped member is a pulley block 25 over which extends a cable 30. One end of this cable passes to a suitable winding drum as illustrated at 113 in Figs. 1 to 4. The other end of the cable may be suitably attached to either of the lugs 57 on the scoop 50.

By properly locating the lugs 57 with relation to the centre of gravity of the load the moments acting on the scoop 50, due to the drawing in of the cable 30 when attached to the lug 57, can be so determined that the rotation of the winding drum at 113 will first tip the boom forwardly over the rear portion of the truck, as shown in Fig. 2, with the load remaining in the horizontal position and upon a further drawing in of the cable 30 the scoop and load will be rotated in the bearings 34 and 35 until the load will be up-ended into a substantially upright position as shown in Fig. 3, the ear 152 and lug 151 acting as a position stop.

The pivotally supported casting is provided with a shoulder 59 which is in the position as illustrated in Fig. 9, when the scoop is horizontal as in Figs. 1 and 2. The shoulder 59 is adapted to engage and operate automatic mechanism for controlling the cable which will be herinafter more fully described.

Toward the outer end of the scoop a load retaining latch 49 is slidably mounted between the arcuate ribs 58 and engages a substantial portion of the circumference of the roll when drawn out to the roll locking position.

On each side of the boom I provide a suitable resilient connection with a portion of the truck frame in front of the pivot 22. As illustrated, I preferably pivot to each arm of the channel beam constituting the boom, the upper ends of the tubular sockets 60. Extending from these socket members, coaxially therewith, are rods 62. These rods extend loosely through tubular heads on partially tubular members 64, pivoted at 65 to the frame 10. On the lower ends of the rods 62 are nuts 66 limiting the upward movement of the rods. Surrounding the reduced upper ends of the rods and bearing against collars formed at the junction of the reduced and full sized portions of the rods and extending into the bore of the members 60 and seated against the far end of such bore, are compression springs 67.

The construction described provides two lateral tie members for the boom adapted to limit its outward swing to substantially vertical position, as shown in Figs. 1 and 4. These springs provide an elastic cushion for the boom when it is drawn forwardly by the cable over the truck frame, the rods 62 telescoping within the tubular members 60 and 64, allowing the socket member 60 to approach the tubular member 64 as illustrated in Figs. 2 and 3. The engagement of the members 60 and 64 forms a positive stop limiting the inward swing of the boom. When the cable is released the reaction of the springs and the weight of the load raises the boom to the upright position of Fig. 4, suitable for discharging the load.

Fig. 1 indicates at A a paper roll lying horizontally in the scoop 50. The lugs 57 are located on the scoop 50 as hereinbefore stated in such a manner that a tilting movement of the load will take place before the load rotates on the pivot 45. I have found that such an arrangement requires one or more terminals or lugs for the cable 30 and the end of the cable is attached to the upper or lower lug 57 in accordance with the length of the paper roll being handled.

When the roll has reached the up-ended position shown in Fig. 3 the shoulder 59 will have rotated sufficiently to engage a bell crank lever 68 and automatically open a switch controlling the winding drum. The load is now in position for transportation by the truck as desired.

It will be seen that with the mechanism described, the truck may be backed into position adjacent to a horizontal paper roll and the latter rolled into the scoop. The end of the cable may then be attached to the scoop and the winding motor started. The boom will immediately be tipped over the truck frame and yieldably supported, thereby raising the load, and thereafter tilting the same into substantially upright position resting on the end 56 of the scoop, ready for transportation. When the desired new location is reached the paper roll is deposited simply by paying out the cable 30. The first result of this paying-out movement is for the springs 67 to raise the boom sufficiently for the weight of the load to complete the movement into upright position as shown in Fig. 4, whereupon the edge of the paper roll, away from the end of the truck, will drop by gravity to the floor and the truck may be moved forwardly withdrawing the end 56 of the scoop 50 from the roll and leaving it deposited in upright position.

Any suitable winding mechanism may be provided for pulling in and paying out the cable 30. I find it very convenient to use an electric winch for this purpose, which provides a winding drum, a motor geared to it and suitable mechanism making the device self-locking whenever the motor rotation stops, but enabling the winding in at will and also the paying out of the cable whenever desired, by rotating the drum in the unwinding direction faster than gravity and the action of the springs 67 tend to rotate it.

Figure 10:
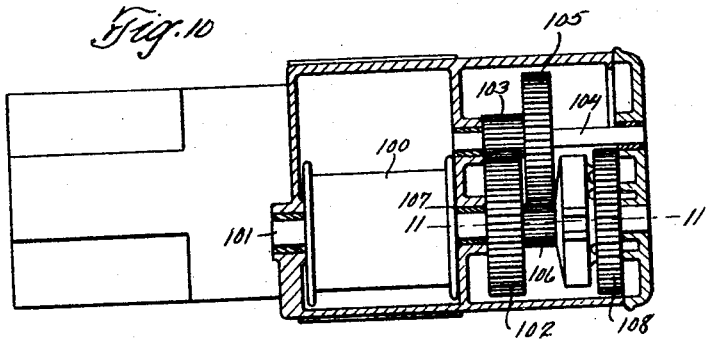
Fig. 10 is a detail in horizontal section, illustrating the winding mechanism which may be employed.
Figure 11:
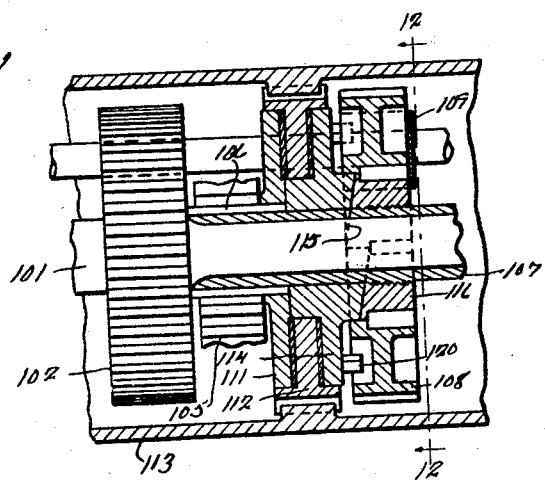
Fig. 11 is an enlarged vertical section of the same taken on the line 11—11 of Fig. 10.
Figure 12:
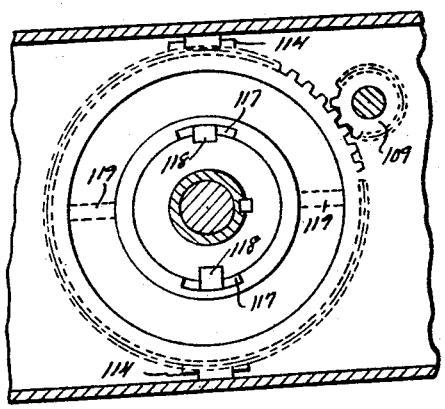
Fig. 12 is a transverse section of the same on the line 12—12 of Fig. 11.

A convenient form of winding mechanism as above outlined is illustrated in Figs. 10, 11 and 12, where the winding drum 100 is on a shaft 101 which carries a spur gear 102 meshing with a pinion 103 on a shaft 104. A spur gear 105 on this shaft meshes with a pinion 106, on a sleeve 107 which is loose on the shaft 101. Surrounding the sleeve 107 is a spur gear 108 which is connected with the sleeve by means allowing independent movement for only a fraction of a rotation. This gear 108 meshes with a pinion 109 (Figs. 1 to 4) on an extension of the armature shaft of a motor 110. Between the gear 108 and the pinion 106 is a friction brake effective whenever the raising rotation stops. This consists, as shown, of a disc 111 rigid with the sleeves 107, an annular friction member 112 alongside of the disc and held stationary by engagement with the casting 113 of the winding mechanism, and an annular cam member 114 on the other side of the friction member 112 and loosely splined on the sleeve and having on its outer side a face cam 115. This cam is adapted to be abutted by a complementary cam 116 which is rigid on the sleeve 107 and has a portion extending within the spur gear 108. The gear 108 has notches 117, Fig. 12, which are occupied by lugs 118 on the cam member 116 to allow some freedom of movement between the gear and cam member. After this freedom is taken up in the raising rotation of the gear, the gear drives the cam member 116, and this, by reason of the direction of the inclines, frees the brake member 114 from braking friction and positively carries it around by reason of the engagement of the shoulders on the two cams.

It will be seen, therefore, that in the raising direction the mechanism provides first for relieving the brake, and then for furnishing a direct train of spur gearing between the armature and the raising drum. When the raising rotation ceases the tendency of the load is to rotate the train of gears in the opposite direction, and as the gear 108 moves in this backward direction the brake member 114 lags behind it so that the brake becomes applied by reason of the inclined action of the cams and the load is held.

To lower the load the armature is simply driven in the reverse direction from the raising movement. This turns the gear 108 backwardly faster than the load would turn it, and in this movement webs 119 on this gear engage lugs 120 on the cam member 114, and carry it around so that the brake is not applied.

The engagement of the webs 119 with the lugs 120 takes place before the other ends of the notches 117 engage the lugs 118. Whenever this lowering rotation of the armature stops, the tendency of the load to pull the train of gearing applies the brake, as already described.

It will be realized from the above description that the device illustrated is self-locking whenever the motor rotation ceases, whether it has been raising or lowering the load. It is to be understood, however, that the winding mechanism so illustrated and described is simply set out by way of illustration, as any self-locking winding mechanism may be used. The particular winding mechanism shown is believed to be manufactured under Patent No. 1,020,014, granted March 12, 1912 to G. A. Armington, to which reference may be made for a fuller description of it.

The winding motor 110 is shown as supported on the bracket or base plate extending from the gear housing 113. All of these parts may be a self-contained unit mounted on a suitable platform 122 secured to the rear of the forward housing 13 and supported by it and by suitable struts 123 rising from the frame members 10. By supporting the winding winch directly behind the housing for the battery and driving motor and above the rear frame, it does not crowd the housing and is out of the way of the boom when tipped over as shown in Figs. 2 and 3, and at the same time the cable may pass directly from the winch to the top of the boom and obtain a sufficiently direct pull for readily tipping the latter.

As one of the uses of the present truck is for handling paper rolls, it is desirable to provide automatic mechanism to stop the inward swing of the boom at a definite point, thereupon tilt the roll into a substantially upright position and then stop the operation of the winding drum. It is desirable also to have the mechanism under the constant control of the operator for lowering the roll so that it may be gently deposited in an upright position from the truck. I provide a simple mechanism for effecting these results, which is shown in Figs. 1 to 4 and which will now be described.

130 indicates a suitable double-pole double-throw knife switch adapted to break the current in either direction on the raising motor 110, the bottom position of the switch being for raising and the top position for lowering. This switch is operated by a push and pull rod 135, which carries an operating handle 145, and is connected with the arm 134 of a bell crank, pivoted at 133 on a bracket secured to the frame 13. The other arm 132 of the bell crank is connected by a link 131 with the switch. The rod 135 slides loosely through a suitably supported bracket 136 and has two collars 137 equally spaced on the rod from the bracket when the switch and associated parts are in open or neutral position. Surrounding the rod, between the collar 137 and the two brackets 136, are compression springs 138 so that the handle can be moved in either direction only against the springs, which tend to restore the handle to neutral position.

The knife switch is swung into raising position by an outward pull on the handle 145 which causes a downward pull on the link 131 through the bell crank described. Rigidly connected with the bell crank is a third arm 139 having secured thereto a collar 140 slidably receiving a rod 141 having adjustably fixed collars 142 and 143 thereon.

To start the raising operation the operator simply pulls out the handle 145. The motor now operates and winds up the cable 30, tipping the boom forwardly over the rear portion of the truck and at the same time raising the paper roll. As the boom is coming into its final horizontal position as shown in Fig. 2 as the drum 113 continues to draw the cable in the scoop containing the paper roll is then revolved about the pivot bearings 34 and 35 until it is tilted into upended position. As the boom approaches its extreme forward tipped position the rod 141 slides idly through the collar 140 until the fixed collar 143 thereon approximately reaches the collar 140.

As the paper roll approaches its up-standing position the shoulder 59 strikes the upstanding arm on the bell crank 68 projecting thru an opening 27 in the casting 21, and moves the arm 68 downwardly from the position shown in Fig. 3. This movement is transmitted through the rod 141, the collar 143 engaging and moving the collar 140 secured to the bell crank 132, thereby pushing the link 131 upwardly and moving the switch into neutral position. This opens the current to the motor and the self-locking mechanism retains the load in such position.

To lower the load the operator pushes in on the handle 145, which movement pushes the link 131 further upward and swings the knife switch 130 into its upper engagement to direct current in the reversing direction to the motor, which allows the cable to pay out, the load being lowered as long as the handle is held in. Whenever the operator relieves the force on the handle the springs 138 restore the handle to neutral position, which swings the switch open and stops the motor, and the self-locking mechanism holds the load.

When the load has been lowered to the position shown in Fig. 4, the paper roll will tip under the influence of gravity until the edge remote from the truck strikes the floor. The truck may then be moved forwardly, which will withdraw the scoop from the roll and leave it deposited in up-ended position. As shown in Fig. 1 the lower side of the scoop, when in horizontal position, is heavier than the upper so that after depositing the load, after the Fig. 4 position has been reached, gravity will cause the empty scoop to return to horizontal position. As it comes into such position the lug 150 (Fig. 9) will strike the under side of the bell crank arm 68 and raise the same from the Fig. 4 position to that shown in Fig. 1, thereby restoring the switch 130 to neutral position.

By the above described means the load-supporting member may be raised and tilted and then lowered under constant control of the operator, and yet be automatically stopped upon reaching extreme movement in either direction, thereby preventing any possible damage from failure of the operator to stop the motor by movement of the handle 145.

The truck may be also utilized in lifting a roll that is in an up-ended or vertical position. The ear 56 on the lower end of the scoop is beveled along the outer edge to prevent damaging of the roll when the truck approaches it while in a vertical position, and the counterweight 153 acts to tilt the scoop to a horizontal position.

Furthermore, the roll may be transported while in this position and then be deposited at the new location in a vertical position or may be rotated from a vertical to a horizontal position and then be deposited.

I claim:

1. The combination of a truck, load engaging means pivotally mounted thereon, and swingable in two directions, and a continuously active mechanism for successively swinging the load engaging means in said directions.

2. The combination of a truck, means pivotally mounted thereon for engaging a load and a unitary mechanism for swinging the load-engaging means about a transverse axis and an inclined axis extending longitudinally of the truck, the swinging movements being successive.

3. The combination of a truck, a support swingably carried at one end thereof, a load engaging device pivoted to the support on an axis extending longitudinally of the truck, and means reacting on the support and the load-engaging device to automatically tilt the same on their axes respectively.

4. The combination of a truck, a boom connected at one end thereof, means for tipping the boom inwardly over the truck and thereby raise a load pivotally supported thereon, and a unitary mechanism for tipping the boom and for rotating the load about an inclined axis in a different direction.

5. The combination of a truck, a boom pivoted thereto, load supporting means pivotally supported on the boom, an actuating mechanism mounted on the truck for actuating the load-receiving means to swing the load into an upended position while the mechanism is reacting on the boom to cause the latter to suspend the load, during the actuation of the load-receiving means.

6. The combination of a truck frame, a boom pivoted to the truck frame, a load carrier pivoted to the boom on an axis extending transversely of the boom and means for swinging the load about the carrier axis and the boom axis.

7. The combination of a truck, a boom pivoted at its lower end to the rear end of the truck, a load-engaging device pivoted to the boom on an inclined axis extending longitudinally of the truck and transversely of the boom, means for tipping the boom, and automatic means for turning the load-engaging device on its axis after the boom has been tipped.

8. The combination of a truck, a boom pivoted thereto, means for pivotally supporting a load adjacent to the lower end of the boom, means manually released for raising and lowering the load and automatic means for causing the load to be tilted into a substantially upright position, after being raised.

9. The combination of a truck, a boom pivotally connected therewith, a flexible member depending along the boom for tipping the boom inwardly and raising a load pivotally supported thereon and means for rotating the support and tilting the load into a different position.

10. The combination of a truck, a boom pivotally connected therewith adjacent to the rear end of the truck, a flexible member depending along the rear face of the boom for tipping the same forwardly beyond the vertical plane through its pivot, a load carried in a support pivotally secured to the lower end of the boom, and means adapted to cause partial rotation of said support and consequent tilting of the load into a different position.

11. The combination with a truck, of a boom pivotally connected therewith adjacent to the rear end of the truck, a flexible member leading from a part of the truck in front of the boom and depending over the boom for tipping the same forwardly beyond the vertical plane through its pivot, a load support pivotally secured to the lower end of the boom, and means for permitting the rotation of this support and consequent tilting of the load into a substantially upright position.

12. The combination of a truck, a boom pivoted thereto, winding mechanism carried by the truck, a flexible member leading from the winding mechanism over a pulley on the boom, means on the outer face of the boom constituting a pivotal seat for a load received and supported in one position, the flexible member being adapted to tip the boom thereby raising the load, and thereafter by continued winding rotate the support upon the boom and tilt the load into a different position.

13. The combination of a truck, a boom pivoted thereto, winding mechanism carried by the truck, a cable leading from the winding mechanism over a pulley on the boom, means on the boom constituting a pivotal seat for a load received and supported on a longer side, the cable being adapted to tip the boom thereby raising the load, and thereafter by continued winding rotate the support upon the boom and tilt the load into position whereby it is supported upon a shorter side.

14. The combination of a truck, a boom pivoted thereto, load supporting means for supporting a load in one position and attached to the lower end of the boom, means for first swinging the boom inwardly and raising the load and thereafter tilting the load supporting means into a different position while reacting on the boom, and means tending to restore the tipped boom to its original position.

15. The combination of a truck, a boom pivoted thereto, rotatable load supporting means carried by said boom, winding mechanism carried by the truck, including a flexible member leading from the winding mechanism over the boom connected to the load supporting means, whereby the boom may be tipped inwardly thereupon raising the load, and locking means for holding the boom in said tipped position.

16. The combination of a truck, a boom pivoted thereto, means for pivotally supporting a load in vertical position on the boom, locking means secured to the truck adapted to engage the boom, winding mechanism carried by the truck, a pulley on the boom, a cable leading from the winding mechanism over the pulley on the boom and connected to the load supporting means whereby the boom and load supporting means may be tipped inwardly.

17. The combination of a truck, a boom pivoted thereto, winding mechanism carried by the truck, load receiving means horizontally supported by the boom when in normal position, means connecting the winding mechanism with the load receiving means whereby operation of the winding mechanism will first tip the boom and raise the load, then tilt the load into substantially upright position, and then automatically restore the boom to original position.

18. The combination of a truck, a boom pivoted thereto, winding mechanism carried by the truck, a flexible member leading from the winding mechanism over a pulley on the boom and adapted to raise a load horizontally supported adjacent to the boom by swinging the boom inwardly, means adapted to cause further operation of the winding mechanism to tilt the load into substantially upright position, and a spring adapted to cushion the inward movement of the boom and to automatically start the boom to raising position when the winding means slackens on the flexible raising member.

19. The combination of a truck, a boom pivotally connected thereto, winding mechanism on the truck adapted to tip the boom and raise a load supported adjacent to the boom, and thereafter tilt the load into substantially upright position, automatic means for stopping the raising and tilting movement of the winding mechanism, and manual means for controlling the lowering movement and stopping it whenever desired.

20. The combination of a truck, a boom pivotally connected thereto, load supporting means rotatably secured to the boom, winding mechanism on the truck including a flexible member adapted to tip the boom and raise a load reclinably supported adjacent to the boom, latching means for retaining the load on the load support, automatic means for stopping the raising and tilting movement of the winding mechanism, and manual means for controlling the lowering movement in stopping it whenever desired.

21. The combination of a truck, a boom pivotally connected thereto, a flexible member extending over a pulley at the outer end of the boom and adapted to be secured to a load pivotally supported by said boom, self-locking winding mechanism for the flexible member, operation of the winding mechanism first tipping the boom and raising the load, automatic means for causing continued operation of the winding mechanism to tilt the load into substantially upright position, automatic means for stopping the operation of the winding mechanism, and manual means for controlling the lowering movement and stopping it whenever desired.

22. In combination with a truck, a boom pivoted thereto, a load engaging device pivoted to the boom on an axis longitudinal of the truck, a raising cable connected to the load engaging device in a manner adapted to tilt it and thereafter revolve it about said longitudinal axis into a substantially upright position, a self-locking winding mechanism for the raising cable, automatic means for stopping the operation of the winding mechanism, and manual means for controlling the lowering movement of the load and stopping it whenever desired.

23. The combination of a truck, a boom pivoted thereto, means for pivotally supporting a load adjacent to the lower end of the boom, means for raising and lowering the load, and means automatically acting on the boom for causing the load to be tilted into a substantially vertical position after being raised.

24. The combination of a truck, a boom pivoted thereto, winding mechanism carried by the truck, load handling means pivotally supported by the boom when in normal position, and means connecting the winding mechanism with the load handling means whereby operation of the winding mechanism will first tip the boom and raise the load, then tilt the load into substantially horizontal position.

25. The combination of a truck, a boom pivotally connected thereto, winding mechanism on the truck adapted to tip the boom and raise a load supported adjacent to the boom, and thereafter tilt the load into substantially horizontal position, automatic means for stopping the raising and tilting movement of the winding mechanism and manual means for controlling the lowering movement and stopping it whenever desired.

26. A machine for handling large rolls of paper comprising, in combination, an auto truck, and means mounted on said truck for raising one of said rolls into an upright elevated position and supporting the roll in said position while it is transported.

In testimony whereof, I hereunto affix my signature.

CLYDE E. COCHRAN.